United States Patent
Luongo et al.

(10) Patent No.: US 11,129,426 B2
(45) Date of Patent: Sep. 28, 2021

(54) UNIVERSAL FINGER BLINDS

(71) Applicants: Sarah M. Luongo, Johnston, RI (US); Justin H. Luongo, Johnston, RI (US)

(72) Inventors: Sarah M. Luongo, Johnston, RI (US); Justin H. Luongo, Johnston, RI (US)

( * ) Notice: Subject to any disclaimer, the term of this patent is extended or adjusted under 35 U.S.C. 154(b) by 20 days.

(21) Appl. No.: 16/459,766

(22) Filed: Jul. 2, 2019

(65) Prior Publication Data

US 2021/0000204 A1   Jan. 7, 2021

(51) Int. Cl.
| | |
|---|---|
| *G09B 13/00* | (2006.01) |
| *A41D 19/015* | (2006.01) |
| *A41F 1/06* | (2006.01) |
| *G09B 15/00* | (2006.01) |
| *G09B 13/04* | (2006.01) |

(52) U.S. Cl.
CPC .......... *A41D 19/01582* (2013.01); *A41F 1/06* (2013.01); *G09B 13/04* (2013.01); *G09B 15/00* (2013.01)

(58) Field of Classification Search
None
See application file for complete search history.

(56) References Cited

U.S. PATENT DOCUMENTS

| | | | | | |
|---|---|---|---|---|---|
| 3,971,140 | A | * | 7/1976 | Martinez | G09B 13/04 434/227 |
| 5,261,393 | A | * | 11/1993 | Weinzweig | A61H 1/0288 2/21 |
| 5,538,431 | A | * | 7/1996 | Dempster | G09B 13/00 434/118 |
| 5,554,032 | A | * | 9/1996 | Troudet | G09B 5/065 434/233 |
| 6,010,262 | A | * | 1/2000 | Linyear | A47B 21/0314 248/441.1 |
| 6,089,872 | A | * | 7/2000 | Mayhue | G09B 13/04 434/233 |

* cited by examiner

*Primary Examiner* — Sunit Pandya

(57) ABSTRACT

Universal Finger Blinds: a bottomless, adjustable, portable covering for the hands and fingers purposed to obstruct the hands and fingers from view to operate and develop necessary skills for muscle memory to manipulate equipment including but not limited to: keyboards, typewriters, computing and calculating devices or for various dexterity skills that require obstructed vision of the hands and fingers. One may desire to look at the fingers to assure proper placement. Instead the goal should be avoid looking at the hands and fingers, yet achieve proper finger placement. The present invention results with a hand and finger covering that stays in place while in use, covers the hand surface without clashing the left and right hands, and fits comfortably to the user's wrist. Such use will allow a proprioceptive occurrence leaving the eyes to focus on written material while hands and fingers achieve muscle memory resulting with proper finger placement.

12 Claims, 6 Drawing Sheets

UNIVERSAL FINGER BLINDS

BACKGROUND OF THE INVENTION

Field of the Invention

This invention relates to gaining proprioception with Universal Finger Blinds while using: a keyboard piano, electric musical keyboard, computer keyboard, typewriter, or other keyboard devices; calculating devices; various skills that require obstructed vision of the hands and fingers. More particularly, the present hand and finger blind's bottomless design customizes to fit hands and fingers from child to adult encouraging the user's eyes to focus on the written materials, allowing the "blinded" hands and fingers to exercise and know keyboard or computer geography and how keys are distanced and placed. Pianists, coders, typists, and the like can freely move and extend hands and fingers comfortably while teaching the eyes and hands-and-fingers to work independently of each other.

Description of the Related Art

The most taught behavior for individuals using the keyboard and computing devices is learning to keep the eyes on the written material while keeping hands and fingers on the keyboard resulting in learning keyboard geography and developing muscle memory. Hands and fingers working independently from the eyes will enable familiarity and proper finger placement on the keyboard and computing devices which is essential for a successful and efficient outcome. This behavior is useful to effectively improve the ability to focus on becoming a fluent sight reader while teaching the hands and fingers to work on their own.

Placing a piece of paper or draping a material to cover the hands and fingers has been thought an effective means to obstruct vision between eyes and hands-and-fingers; however, the loose paper and the drape often fall off and cause more disruption and less consistency of learning and in the end, does not enable developing independent finger placement. Attaching a panel to the keyboard to obstruct vision is ineffective as not all keyboards have a protrusion or a protrusion at the proper height to attach the panel properly, so it cannot be used in all circumstances; additionally, a panel is not a convenient or portable device to easily carry from home, to work, to school, to piano lessons, to the library, and so forth.

Universal Finger Blinds is a portable necessary tool allowing keyboard and computer users to have free movement of the arms, hands and fingers while obstructing the view of the hands and fingers from the eyes. The hands and fingers need not be dependent of the eyes in order to find the proper placement. Successful hand and finger placement should come as a "sixth sense" allowing the user to keep close attention to the sheet material, forcing the hands and fingers to find the proper placement independently.

The following patents describe a learning device for hands or fingers using a keyboard: J.P. Pat. No. 3,183,385 issued on May 16, 2013, discloses A player can see the score on the music stand, and to create a state that can play the piano in a state that can not see a piano keyboard from the player, to learn touch typing in piano performance to provide a blind for the piano keyboard shielding can. The A piano keyboard along with provided shielding portions 1 and the shielding portion for covering from view, characterized by being configured with an engaging portion 2 for engaging the fallboard and the shield portion of the piano keyboard to. '385 attaches to the keyboard related instrument, it does not attach to the user's wrist to cover the hands and fingers. It is only useful on a musical keyboard. It is not easily portable.

U.S. Pat. No. 7,378,585 issued on May 27, 2008, to Rob McGregor declares A portable musical teaching interface system for purposes of providing the user with the skills necessary to play the piano. The interface system comprising a pair of gloves each having a plurality of finger sleeves adapted to receive the fingers of a user's hands, a display means for providing a virtual representation of the user's hands in relation to said virtual keyboard and a control means in communication with the finger sleeves to provide control signals that cause the finger sleeves to strike the proper keys on the virtual piano to a programmed sequence of movements which corresponds to a selected piece of music. Although '585 is a portable musical teaching system, this invention relates only to the piano. It includes gloves with finger sleeves; it is not a bottomless hand covering.

U.S. Pat. No. 4,204,455A issued on May 27, 1980, to William O. Harrington A playing aid is disclosed to be mounted on the hand for positioning the thumb and fingers to enable the playing of selected intervals of musical pitches on a keyboard instrument such as a piano, organ, synthesizer and the like. The thumb and fourth finger are rigidly held apart a predetermined amount by a pair of grips interconnected by a raised bridging portion adapted to elevate the remaining fingers above the plane of the grips. The device enables simultaneous depression of at least a pair of keys corresponding to selected tonal intervals. '455A is attached to the hand configuring a particular hand position, but does not cover the hand. It does not blind the eyes from the hands and fingers allowing the hands-and-fingers to move freely.

C.N. Pat. No. 205,038,839 issued on Feb. 17, 2016, The utility model discloses a hand shape corrector for piano playing, including six dactylotheca and two mittens, six dactylotheca are worn respectively on the first joint of controlling dual tactics forefinger, middle finger, the third finger for correct the finger flat finger in first joint during the key down, two mittens are worn respectively about on the dual tactics, are used for correcting the wrist and sink, rock from top to bottom and slap the joint and sink, and every gloves back is equipped with the three rigid piece of moulding. Use the utility model discloses finger and the arm of guaranteeing the practitioner can both not influence its normal exercise nimbly and freely when correcting practitioner's hand-type custom. '839 is a corrector for piano playing. It is not teaching the eyes and hands-and-fingers to work independently of each other.

The following patents describe a technique for learning a keyboard:

U.S. Pat. No. 9,495,016 issued on Nov. 15, 2016 John Zachary Dennis Systems, devices, and techniques are disclosed relating to typing input devices. For example a ten-key input device can be provided for receiving input via ten input elements from the ten fingers on a right hand and a left hand. All of the letters of the alphabet can by typed with the ten input elements according to a translation map that maps the ten input elements or combinations of the ten input elements to the letters of the alphabet. '016 aids in technique to learn keyboard geography. It is not a wearable device to blind the eyes from the hands-and-fingers.

U.S. Pat. No. 6,089,872 issued on Jul. 18, 2000, to Glenda F. Mayhue and Robert W. Mayhuel discloses An apparatus for teaching efficient typing comprises a glove (10) having a wristband (14), a backhand section (16) adjacent the wristband, a plurality of finger sleeves (18) adjacent the backhand section and having an opening at a distal end for exposing a fingertip, and a plurality of visually different finger codes (28) extending from said finger sleeves toward said wristband, and a keyboard (12) bearing key codes that visually correspond to the finger codes. '872 has finger sleeves with corresponding finger codes. It is not a bottomless covering exposing the entire bottom half of the hands and fingers.

The following patents describe exercise for keyboard instruments; U.S. Pat. No. 4,836,531 issued on Jun. 6, 1989, to Mikhail Niks showcasing A primary exerciser and cooperating accessory for use by piano players. The primary execiser has an elongate base provided with an elbow stop designed to maintain the elbow of a user in position against rearward or significant sideways movement when the exerciser is in use, and a hand rest spaced ahead of the elbow stop along the elongate base. The hand rest is relatively thin and has a flat upper side sized to permit the forward part of the user's hand to rest on it palm down with the fingers stretched out ahead and the thumb tucked under its rear edge. This hand rest is mounted to slide back and forth from a rear stop position against the resistance of a spring that normally holds it at that position. It is also provided to rotate up and down around a transverse hinge axis near its front end. Additionally, the hand rest is mounted to permit swiveling movement to the right or left around a pivot point in its front portion. The accessory is fitted with spring-loaded keys and is designed for removable mounting on the primary exerciser for purposes of exercising the fingers. The primary exerciser provides exercise of the wrist in up and down movements as well as in such movements combined with sideways movements. '531 is a device utilized separate from playing the piano to exercise the fingers and wrist. It does not exercise hands and fingers while using the piano.

U.S. Pat. No. 6,279,163 issued on Aug. 28, 2001, to Christopher L. Hale and Melissa G. Hale describing A pair of gloves with integral weights on the back of the hand and on the back of the fingers is provided to provide muscle strengthening for specific tasks, such as in practicing a musical instrument. Such use gives the user the perception of lighter hands resulting in quicker hand movement and increased dexterity. '163 strengthens hand muscles while using a weighted glove. It does not use a hand-and-finger covering to be worn to strengthen the hands and fingers to learn keyboard geography while playing the musical piano instrument.

The following patents describe a training device for keyboard instruments; C.N. Pat. No. 206,293,018 issued on Jun. 30, 2017, having The utility model discloses a piano finger training device, this piano finger training device include training glove and training keyboard, training glove fixes in wrist department, and the finger is worn on the finger-stall, and the elastic band is connected between wrist area and finger-stall, can temper the dynamics of each finger through the elastic webbing, the lower bonding force volume of each finger of improvement practitioner, but also can correct practitioner's incorrect hand-type, training keyboard setting the key similar with ordinary piano, drawn adjustable spring dynamometer on the key, not only can adjust the dynamics of playing the key, but also can be directly perceived find out the key dynamics of playing size, can also judge the effect of training according to sound, both mutually support training glove and training keyboard to use and have not only increased finger dynamics the training effect, have strengthened the training sense of reality moreover. The utility model discloses convenient to carry, anytime and anywhere can practise. '018 being an easy to carry invention strengthens keyboard key perception by exercising with an elastic webbing. It does not exercise the eyes and hands and fingers without the use of retention materials.

C.N. Pat. No. 202,601,009 issued on Dec. 12, 2012, containing The utility model discloses a hand type exerciser for a piano keyboard, belonging to the technical field of hand type exercise equipment for keyboard musical instruments. The hand type exerciser consists of an elastic finger exposing glove, elastic belts, a medical one-way valve, an inflatable rectangular airbag and an inflatable circular airbag. The hand type exerciser for the piano keyboard has the advantages that the manufactured materials are more common, the material selection is easy, the cost is low, the manufacture is simple, and the use is convenient; and a hand is subjected to strengthening exercise by using the tension of the elastic belts and the inflatable airbags, so that a correct hand type posture can be effectively kept, the muscle of the hand, a wrist and the muscle of the upper part of the wrist can be effectively exercised, the supporting force strength and key touching force strength of fingers are strengthened, and the opening degree of the fingers is increased. '009 exercises the eyes and hands and fingers to manipulate the keyboard with the use of retention materials. It does not allow hands and fingers to move freely while simultaneously exercising and utilizing the keyboard.

The following patents describe device worn on the wrist:

U.S. Pat. No. 8,726,418 issued on May 20, 2014 to Thomas DeBlasis and Todd Smith is A glove for use by a soccer goalie includes several adjustment mechanisms, such as straps. The straps allow the glove to be adjusted for fit, such as by manipulating the width of the glove across the palm or the size of the wrist opening. Additionally, the glove includes a pull tab that allows the wearer to adjust the position of the fingers of the hand within the glove quickly so that the webs of the fingers remain in contact with the inside of the glove at the bases of the finger stalls. '418 is a glove device; it does not simply entail a cuff-like adjustment device.

U.S. Pat. No. 5,197,149 issued in the name of V. Parker Overton being An athletic glove includes a back strap to compress and support the wrist and hand of the user; the tightening means includes a ring connector. '149 collar-like attachment is attached to the glove with a ring connector affixed to the glove. It does not have a cuff-strap with two sides and two rings affixed to either side of the strap.

However, no relevant art discloses Universal Finger Blinds which is a portable hand and finger covering for each the left and right hand having an adjustable cuff-like attachment for the wrist attached to a bottomless flexible hand and finger covering, customizable for all hand sizes from children to adult to shield and blind the vision while using a keyboard device such as a keyboard, piano, computer keyboard, typewriter, computing device or other similar instruments.

The above cited inventions and patents, taken either singly or in combination, do not describe the instant invention claimed.

SUMMARY OF THE INVENTION

The present invention relates to a Universal Finger Blind device. More specifically, the invention is a portable hand and finger covering for both the left and right hand, assembled with an adjustable cuff-like attachment for the wrist attached to a bottomless mitt or flap as a hand and finger covering which gives an adjustable custom fit: created for all hand sizes from children to adult; resulting as a shield to blind the vision while using: a keyboard device such as a keyboard, piano, computer keyboard, typewriter, computing device, calculating device or other similar instruments; executing various skills that require obstructed vision of the hands and fingers.

The present invention allows the user to keep eyes affixed to written material, allowing the arms, hands and fingers to move freely in effort to learn and manipulate a keyboard, computing or calculating device, and various skills requiring obstructed vision of the hands and fingers.

It is an object of the invention having the blind hover over the hands and fingers and slightly encounter the surface of the hand and fingers while still attached to the cuff-like wristband.

It is an object of the invention to easily flip back and return the blind flap made of a flexible material be it cotton, nylon, foam, polyfoam, flax, fiber, leather, bamboo, paper, film, mesh, plastic, or other natural or manmade material in effort to take a look at the hands and fingers to assure proper placement.

It is an object of the invention where when fingers are stretched and extended, the material covers the hands and fingers while exposing the thumb at times to assure the user of proper starting points.

It is an object of the invention to simply arrange the cuff-like wrist attachment to lay flat and easily store or transport in a binder, folder, carrying case or personal bag.

A feature of the present invention adjusts to fit a range of hand and finger sizes from children to adult by use of clips, snaps, Velcro®, buttons, hook and eye, tongue buckle, magnets, or other means of fastening.

A feature of the present invention entails rings preferably stitched into either side of the cuff-like wrist attachment creating a boundary system so the "cuff" does not release or undo completely allowing the user's wrist to fit into the "cuff" having the other hand simply pull on the cuff strip to fasten by use of clips, snaps, Velcro®, buttons, hook and eye, tongue buckle or other means of fastening.

The present invention is timeless as the keyboard. Keyboarding and typing, computing and calculating, and various skills requiring hand operations will remain for many years as the use of technology and coding increases daily; the use of musical piano or electric keyboards will also continue to be an instrument learned and played for generations to come. Therefore, the present invention will always be relevant and useful.

BRIEF DESCRIPTION OF THE DRAWINGS

The invention can better be understood referencing the following drawings and descriptions.

Such are not scale drawings, rather emphasis being placed on the principles of the invention.

Each attached reference number describes the figures throughout the different views.

Figure 1:
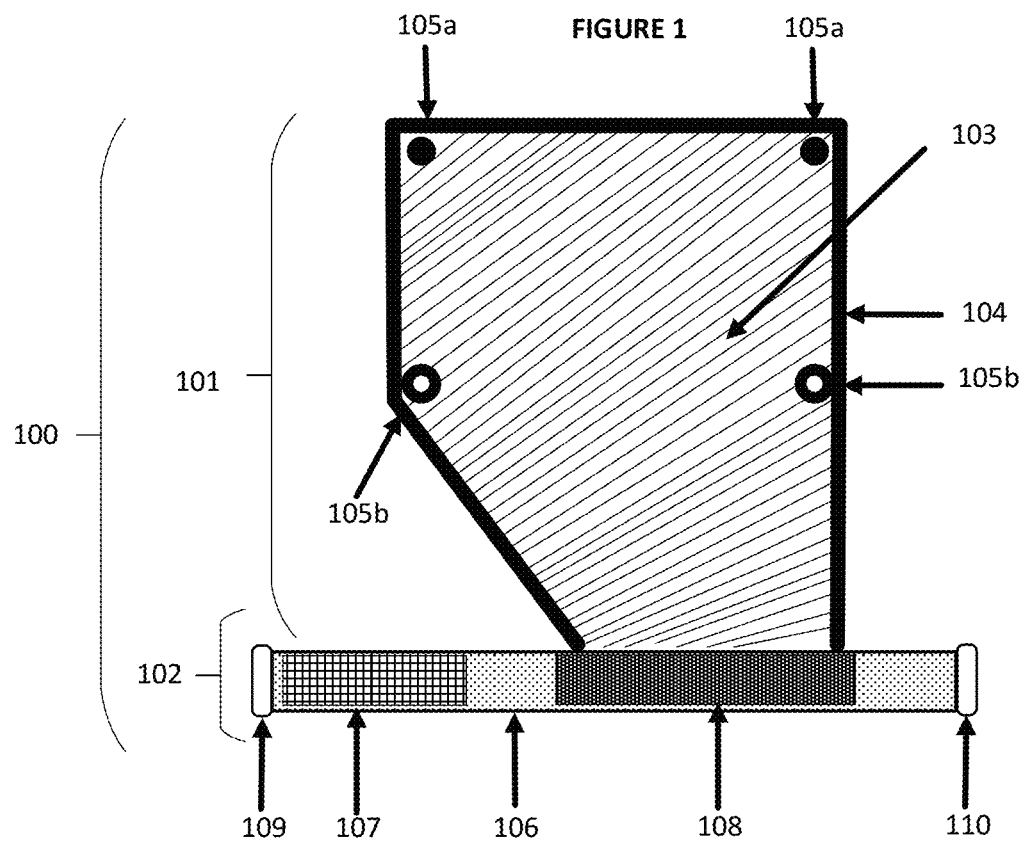

FIG. 1 is a top perspective view of the hand covering before wrist-cuff loop assembly.

Figure 2:
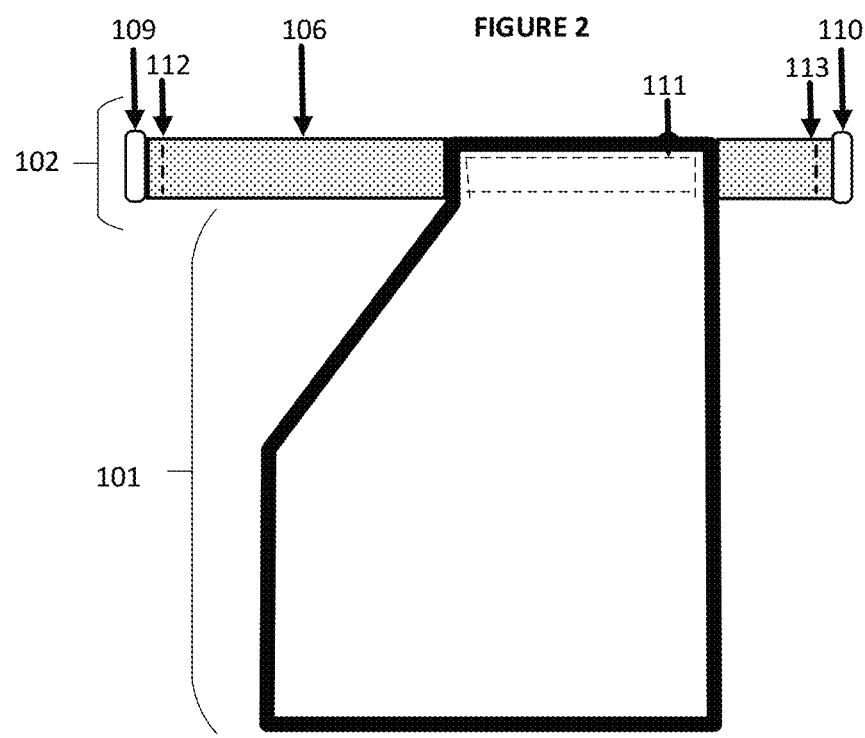

FIG. 2 is a bottom perspective view of the hand covering before wrist-cuff loop assembly.

Figure 3:
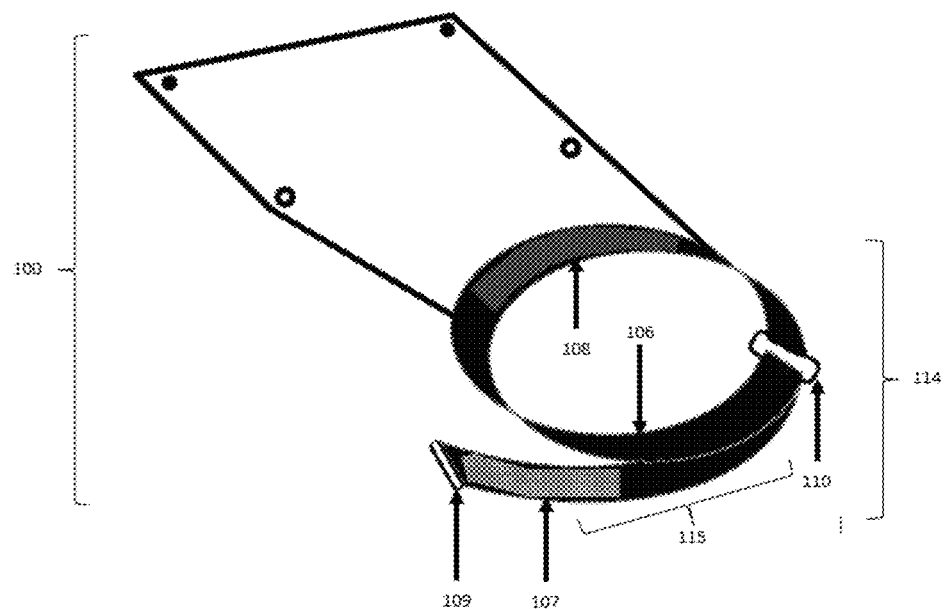

FIG. 3 is a slanted perspective view with wrist-cuff loop assembled.

Figure 4:
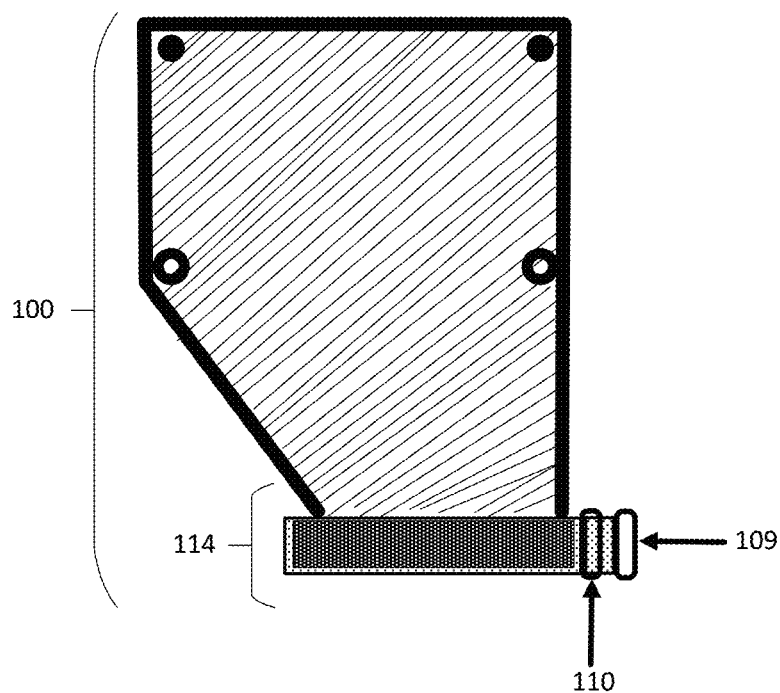

FIG. 4 is a top perspective of FIG. 3 with wrist-cuff pulled on both sides lying flat for easy storage.

Figure 5:
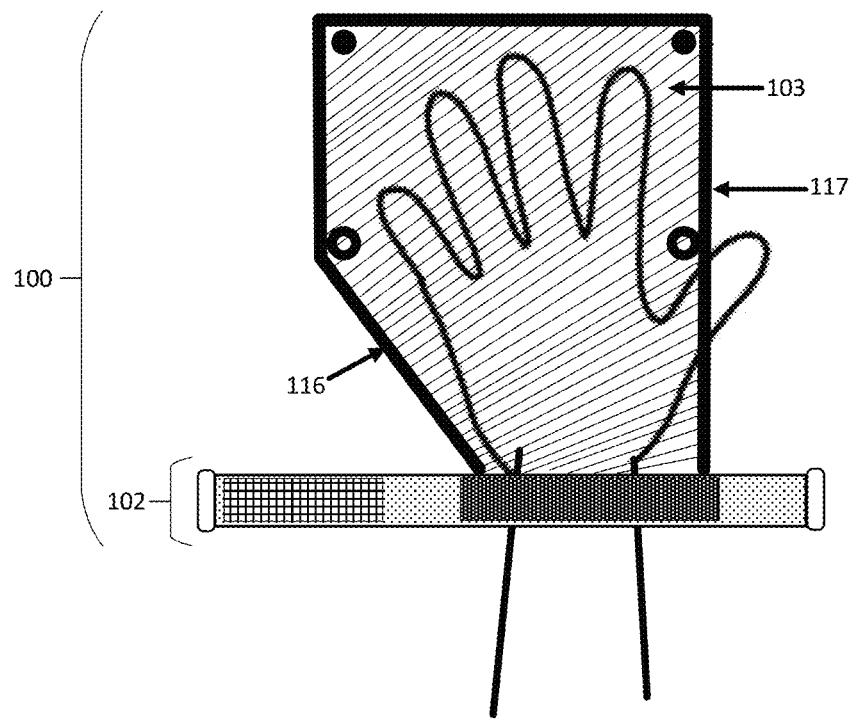

FIG. 5 is a top perspective view of FIG. 1 blinding the user's hand, exposing the thumb if desired.

Figure 6:
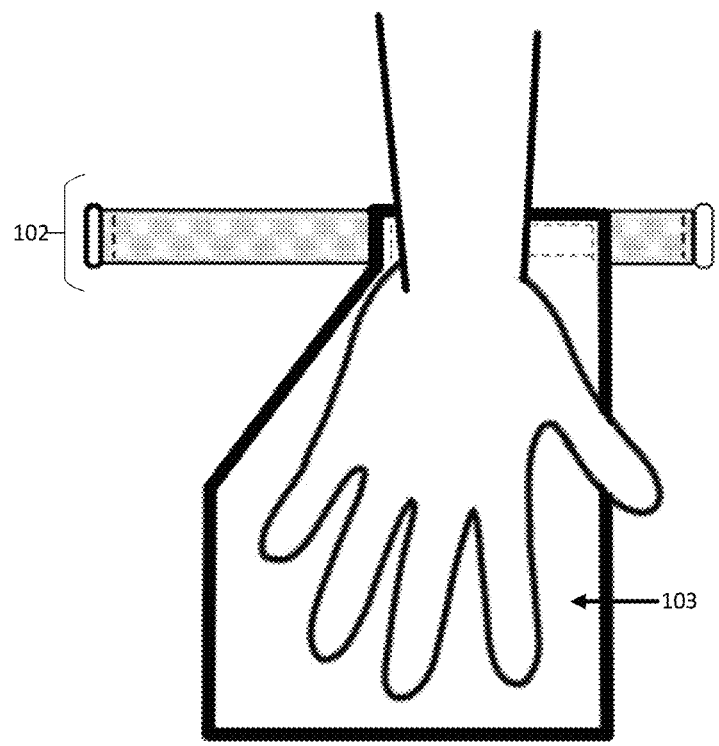

FIG. 6 is a bottom perspective of view of FIG. 2 with the user's palm facing up; the back of the hand is covered, exposing the thumb on the side if desired.

Figure 7:
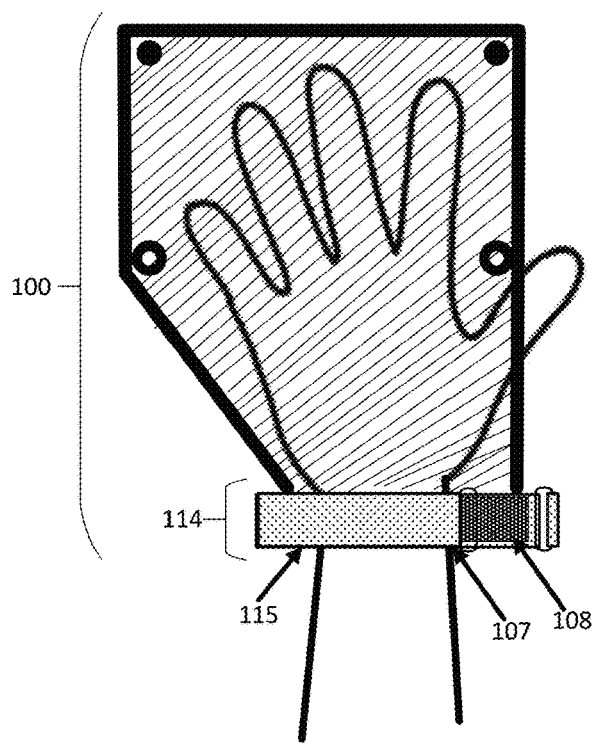

FIG. 7 is an illustrative perspective of FIG. 3 blinding the user's hand, exposing the thumb.

Figure 8:
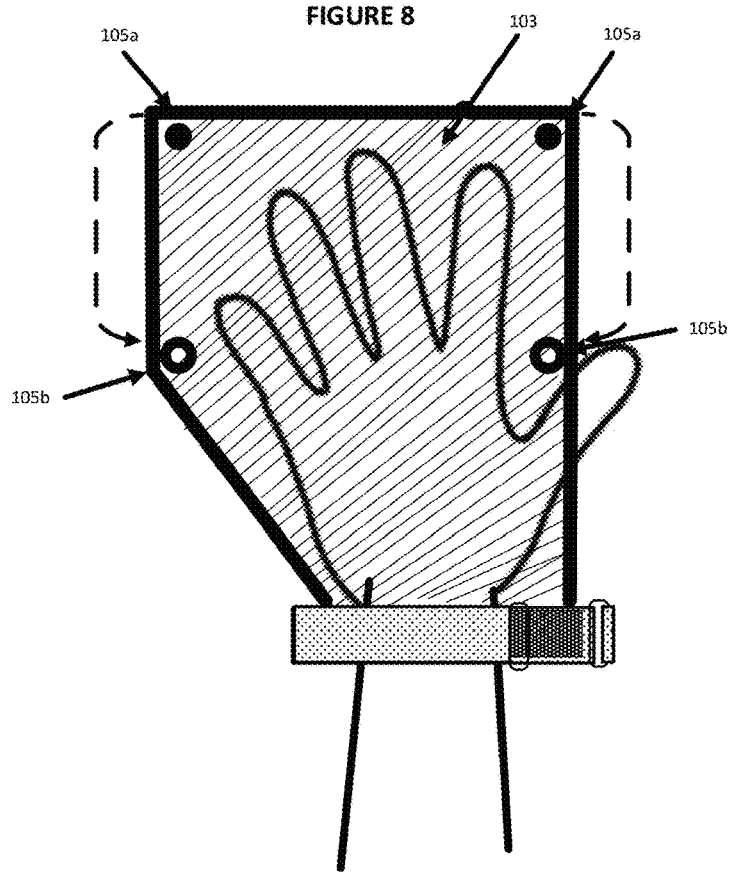

FIG. 8 is a schematic view of FIG. 7 where the top corners fold back for a customized fit on smaller hands.

Figure 9:
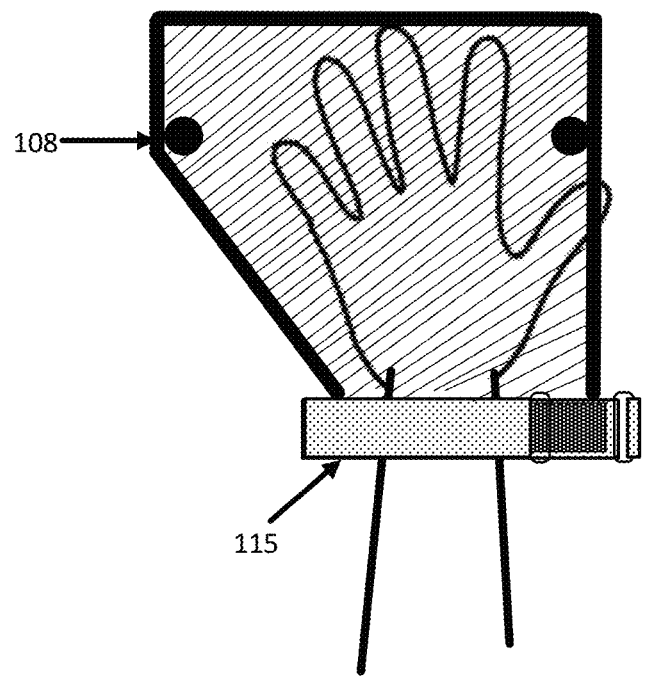

FIG. 9 is a schematic view of FIG. 8 shown on a smaller hand where the cover folds back and the adjustment system fastens showcasing the same product designed to fit all hand sizes.

Figure 10:
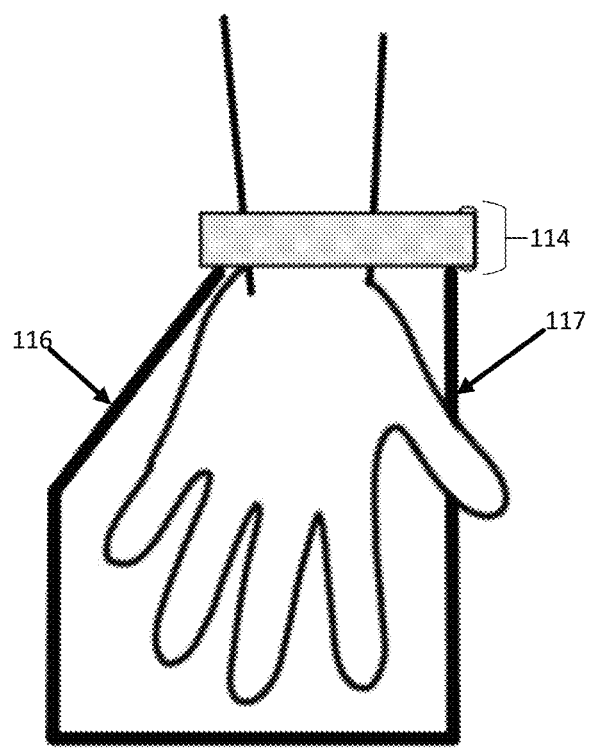

FIG. 10 is a bottom-side perspective view with palms upward and hands-and-fingers against the covering with wrist-cuff loop assembled.

Figure 11:
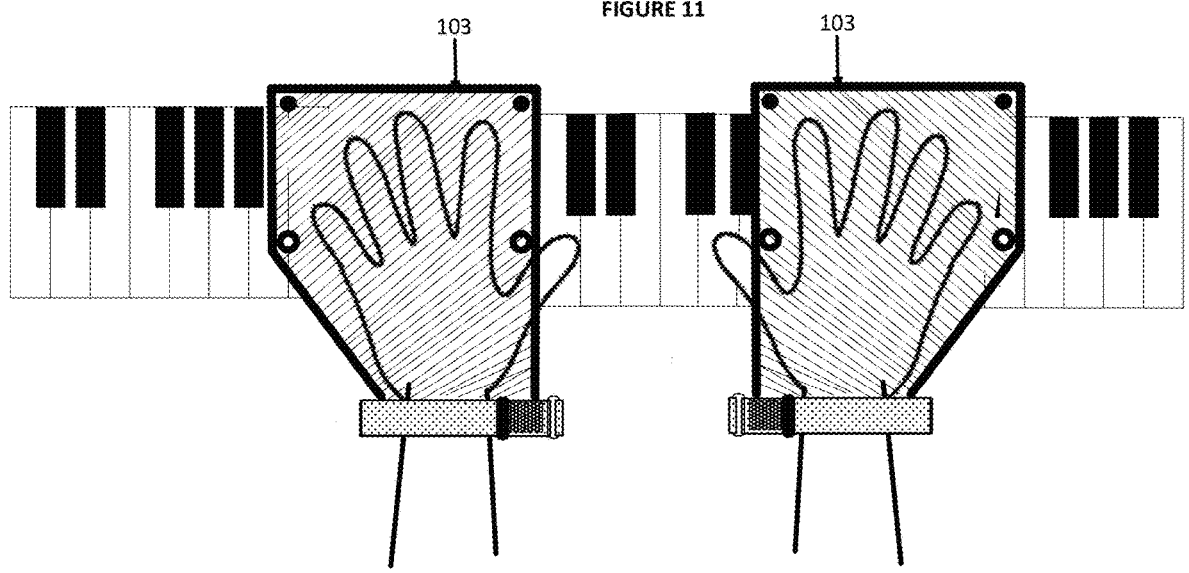

FIG. 11. is an illustrative perspective of FIG. 7 using a piano keyboard.

Figure 12:
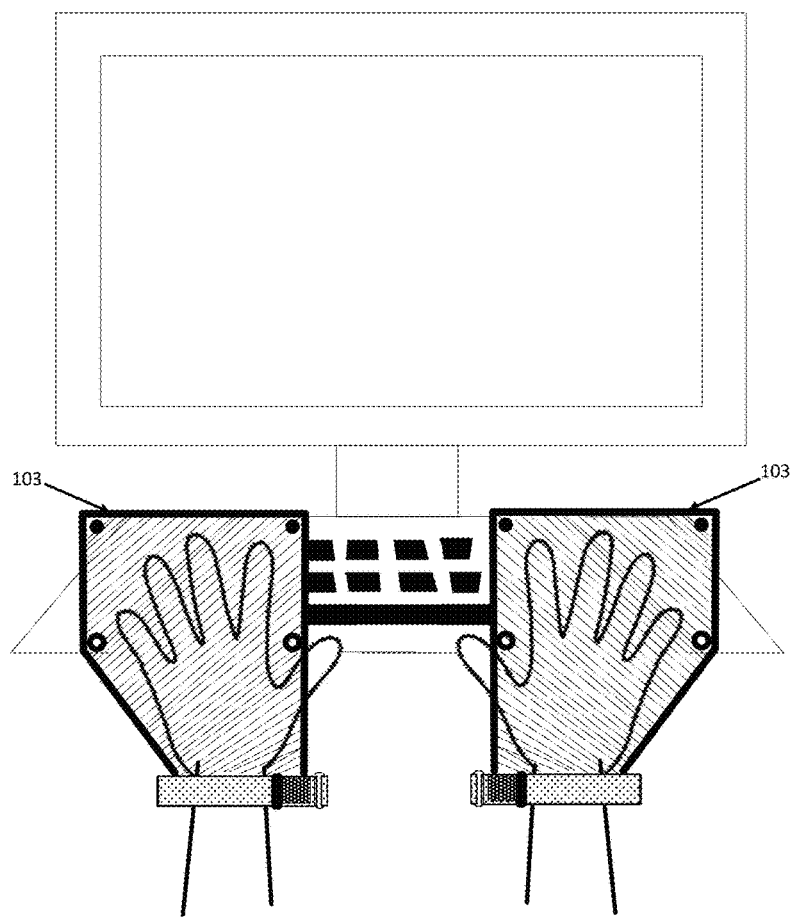

FIG. 12. is an illustrative perspective of FIG. 7 using a computing device.

DETAILED DESCRIPTION OF THE PREFERRED EMBODIMENTS

FIG. 1 is a perspective view of a hand-and-finger covering blind 100 according to the embodiment of the invention. Blind 100 is preferably used as a bottomless dorsal blind of the hand-and-fingers while using a piano, keyboard typewriter or computing or calculating device.

However, blind 100 may be used for other intentions of covering the hands-and-fingers while using various instruments and skills. While only a left-hand finger blind is shown and discussed, it is understood that blind 100 be a pair, with the right-hand blind being formed as a mirror image of blind 100.

Blind 100 generally comprises of two sections, a bottomless, adjustable covering for the hands-and-fingers 101, and an adjustable wrist attachment 102.

101 is comprised of 103: a preferably flexible material hand-and-finger covering, 104: a border affixed, preferably stitched to 103, and an adjustment option 105a and 105b: by use of preferably snaps or other clips, Velcro®, buttons, hook and eye, tongue buckle, magnets, or other means of fastening preferably stitched to 103 to easily fold back creating a smaller, custom sized blind.

FIG. 1 shows 102 is comprised of a wrist strap 106, a fastening agent preferably hook 107 and loop 108 both attached to 106 preferably by stitching or adhesive, and two rings 109 and 110 both attached to 106 preferably by stitching or adhesive.

FIG. 2 is a perspective view where 101 and 102 being affixed together 111 by preferably stitching or adhesive attaching to make one unit. FIG. 2 also indicates where 109 and 110 are each looped around 106 and become affixed and preferably stitched 112 and 113.

In FIG. 3 blind 100 depicts 114: the cuff-like wrist attachment where 109 is preferably positioned through 110 creating a pull tab 115 resulting when 106 be pulled or loosened, 109 and 110 collide and meet to maintain the "cuff-like" shape; FIG. 3 also depicts when a user's hand fits through 114, the user's opposite hand pulls 115 which embodies 107 and affixes to 108 becoming engaged by pressing the two parts together, to achieve the desired tightness.

Alternatively, FIG. 4 is a perspective view of blind 100 lying flat where 114 is pulled on either side until 109 and 110 meet.

FIG. 5 depicts blind 100 where 103 has an angle 116 towards the outer-side of the hand allowing the fingers to stretch and extend, yet still achieve visual obstruction from the eyes; on the opposite inner-side 117 embodies a straight edge allowing the thumb to either be obstructed or exposed to view. FIG. 5 is a perspective view with 102 extended and 103 hovering yet slightly encountering the surface of the user's hand. FIG. 6 is a perspective view with dorsal of the hand on 102 and 103 with the palm facing upward.

An embodiment of blind 100 is shown in FIG. 7 where 114 secures about the user's wrist when 115 pulls to the desired tightness preferably having 107 affix to 108. Another embodiment feature is shown in FIG. 8 when 103 flips backward adjusting until 105*a* fastens to 105*b* achieving a custom fit for smaller hands as shown in FIG. 9, still 115 adjusts to fit the smaller wrist preferably having 107 affix to 108.

As shown in FIG. 10, 114 is comfortably secured about the user's wrist, outer fingers freely angle towards 116, thumb freely towards 117, stretching and extending without constraint under 103.

FIG. 11 and FIG. 12 exemplify a user on a keyboard or piano, and also on a computer keyboard.

Both where 103 cover and obstruct the hands-and-fingers from eyes.

While many different embodiments to which the principles of the present invention have been described, it will be apparent that said descriptions do not limit but rather exemplify the preferred scope of the invention. Therefore, the claims should be read covering all embodiments and implementations of the inventive concept(s). Additionally, various modifications and changes of the inventive concept(s) may be made within the scope of the attached claims.

What is claimed:

1. The present invention relates to a universal finger blind comprising:
    A bottomless dorsal hand-and-finger covering attached to the wrist via a wrist-cuff, creating one unit, securely situated on the top of the hand that functions to obstruct the hands and fingers from the user's sight while operating keyboard, computing, and calculating instruments or implementing various skills that require obstructed vision of the hands and fingers;
    the dorsal hand-and-finger covering, further includes a flexible polygonal, pentagonal or at least a three-side shaped dorsal blind flap;
    an adjustment system attached to the dorsal blind flap configured to customize the size in order to accommodate different hand sizes; and a wrist-cuff attached to the lower portion of the dorsal blind flap to comfortably keep blind in place.

2. The universal finger blind according to claim 1, wherein: said flexible polygonal, pentagonal or at least a three-side shaped dorsal blind flap consists of five sides can range in various sizes and shapes and portions and is not limited to curves and/or design shapes wherein sides are straight in-form of which said flexible dorsal blind flap and consists, of a washable polyfoam and is otherwise not limited to natural or man-made fibers, foams, plastics, polyesters, films, mesh, metal, flax, leather, bamboo but should have the ability to flip back said dorsal blind flap to view the hands and fingers to ensure proper placement.

3. The universal finger blind according to claim 1 wherein: said dorsal blind flap is situated over the hand-and-fingers having no palm layer.

4. The universal finger blind according to claim 1 wherein: said dorsal blind flap is wide and long enough to cover a range of hand sizes from child to adult so having ability to stretch, extend, and move the hands and fingers freely still having an obstructed view from the eyes with potential to expose the thumb regardless of hand size.

5. The universal finger blind according to claim 1 wherein: said dorsal blind flap will not clash left hand materials with right hand materials while in use.

6. The universal finger blind according to claim 1 wherein: further comprising said adjustment system attached to the surface of said dorsal blind flap not being limited to various configurations as means to fasten for a customized fit for a range of hand sizes comprising of permanent snaps at the top left and right hand upper portions with intentions to be secured to the left and right mid portion snaps, but is not limited to clips, Velcro®, buttons, hook and eye, tongue buckle or magnets.

7. The universal finger blind according to claim 1 wherein: further comprising said wrist-cuff being an extension of said dorsal blind flap attached to the lower portion, creating one unit, being permanently stitched but is not limited to other means of fastening with by use of snaps, clips, Velcro®, buttons, hook and eye, tongue buckle or adhesive.

8. The universal finger blind according to claim 7 wherein: said wrist-cuff loop comprising of one strip of material not limited to natural or man-made fibers, plastics, polyesters, elastic, mesh, metal, flax, leather, having two ends which includes a boundary system by means to create an adjustable loop.

9. The universal finger blind according to claim 8 further comprising: a boundary system of two rings on either side, looped around and permanently stitched but not limited to use of adhesive where once intertwined, a pull strap is created; wherein the said boundary system rings interconnect creating a "boundary" where the wrist-cuff loop does not undo completely allowing the cuff to be easily affixed to the user's wrist by pulling on its now circular shape until desired secure fit; wherein the said boundary system may be pulled on either side simultaneously and the cuff will lay flat for easy storage.

10. The universal finger blind according to claim 8 further comprising: an adjustable loop with Velcro® attached to said wrist-cuff loop but not limited to other means of fastening with by use of snaps, clips, buttons, hook and eye, tongue buckle or adhesive; wherein the first Velcro® portion is permanently affixed to the top side of said wrist-cuff loop above the said lower portion of said dorsal blind flap and the second Velcro® portion permanently affixed on the opposite side by stitching.

11. The universal finger blind according to claim 1 further comprising: a unique accessory and training tool of the keyboard, computing or calculating device, and various skills that require obstructed vision of the hands and fingers; further is easily portable; further is compact to easily store in a folder, book, personal bag, computer bag, desk or bench; further is adaptable, configurable and adjustable for various hand and wrist sizes; further blinds the hands and fingers from user's view; further helps achieve muscle memory while obstructing vision from hands and fingers; further does not hinder necessary movement of the arms, wrist, hands and fingers while engaging in keyboard geography.

12. The universal finger blind according to claim 7 wherein: said wrist-cuff comprising of one strip of material not limited to natural or man-made fibers, plastics, polyesters, elastic, mesh, metal, flax, leather having no ends resulting in a continuous loop.

* * * * *